May 13, 1930. W. J. BURGER 1,758,427
INDICATING DEVICE
Filed March 8, 1929 6 Sheets-Sheet 1
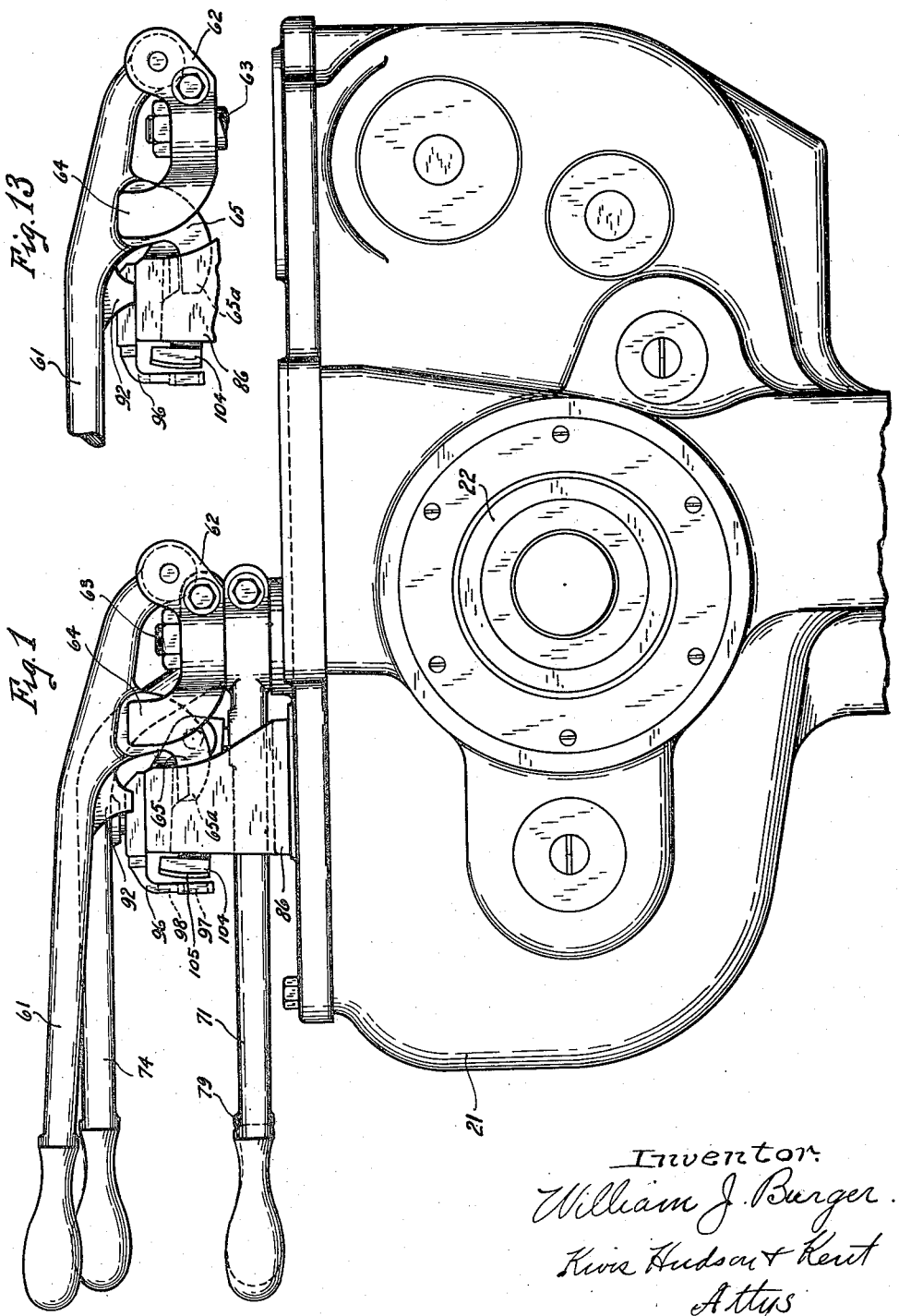

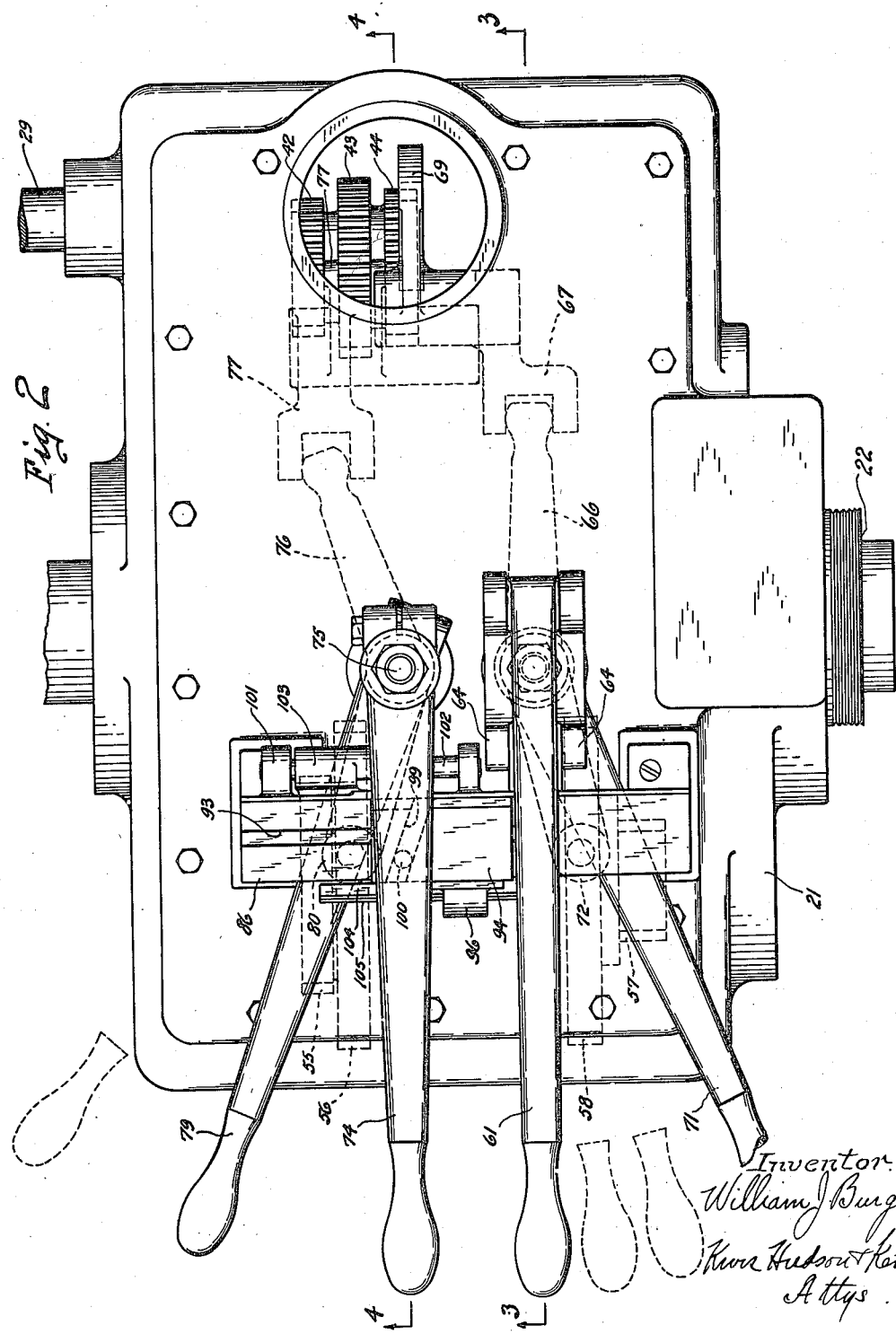

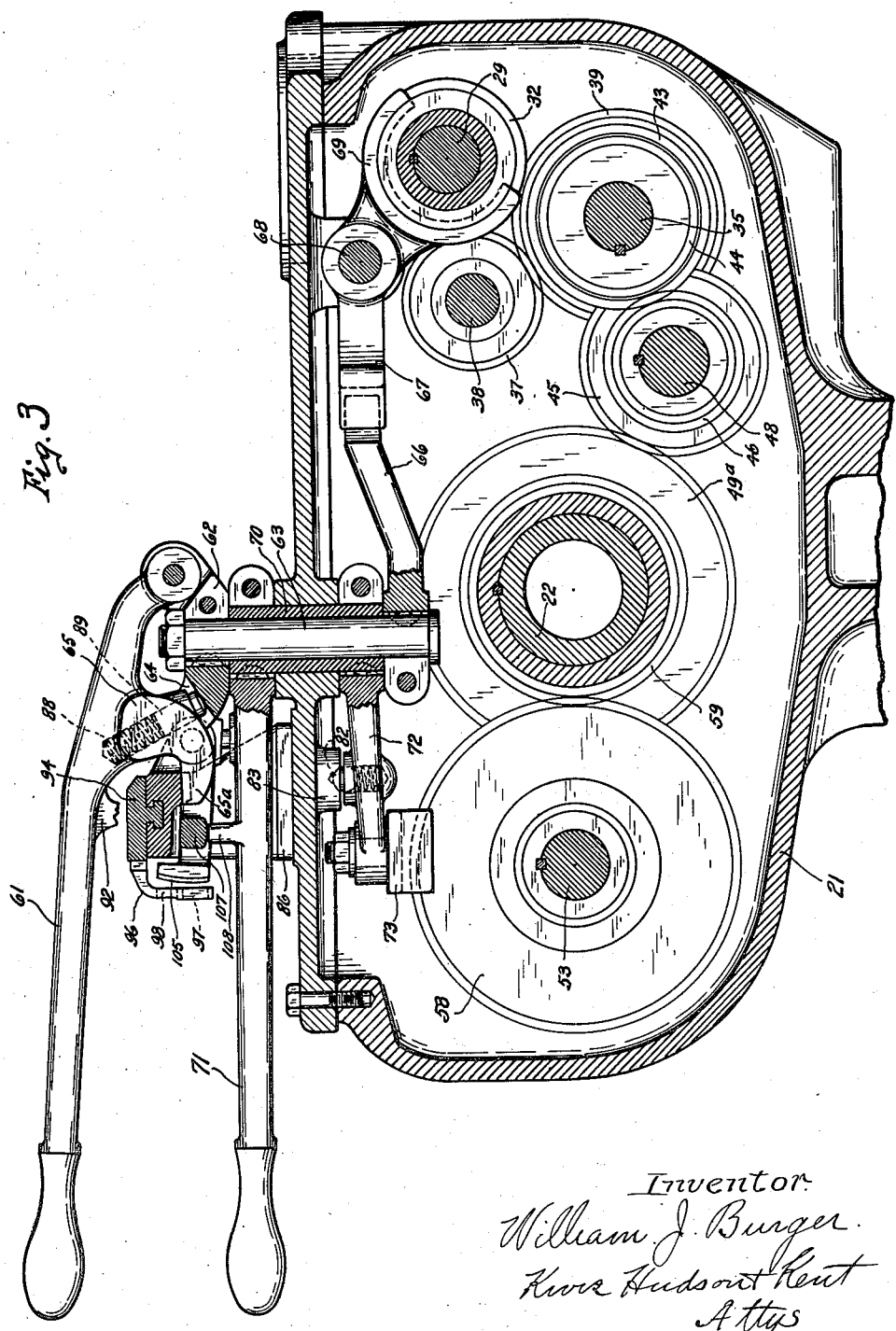

May 13, 1930. W. J. BURGER 1,758,427
INDICATING DEVICE
Filed March 8, 1929 6 Sheets-Sheet 4
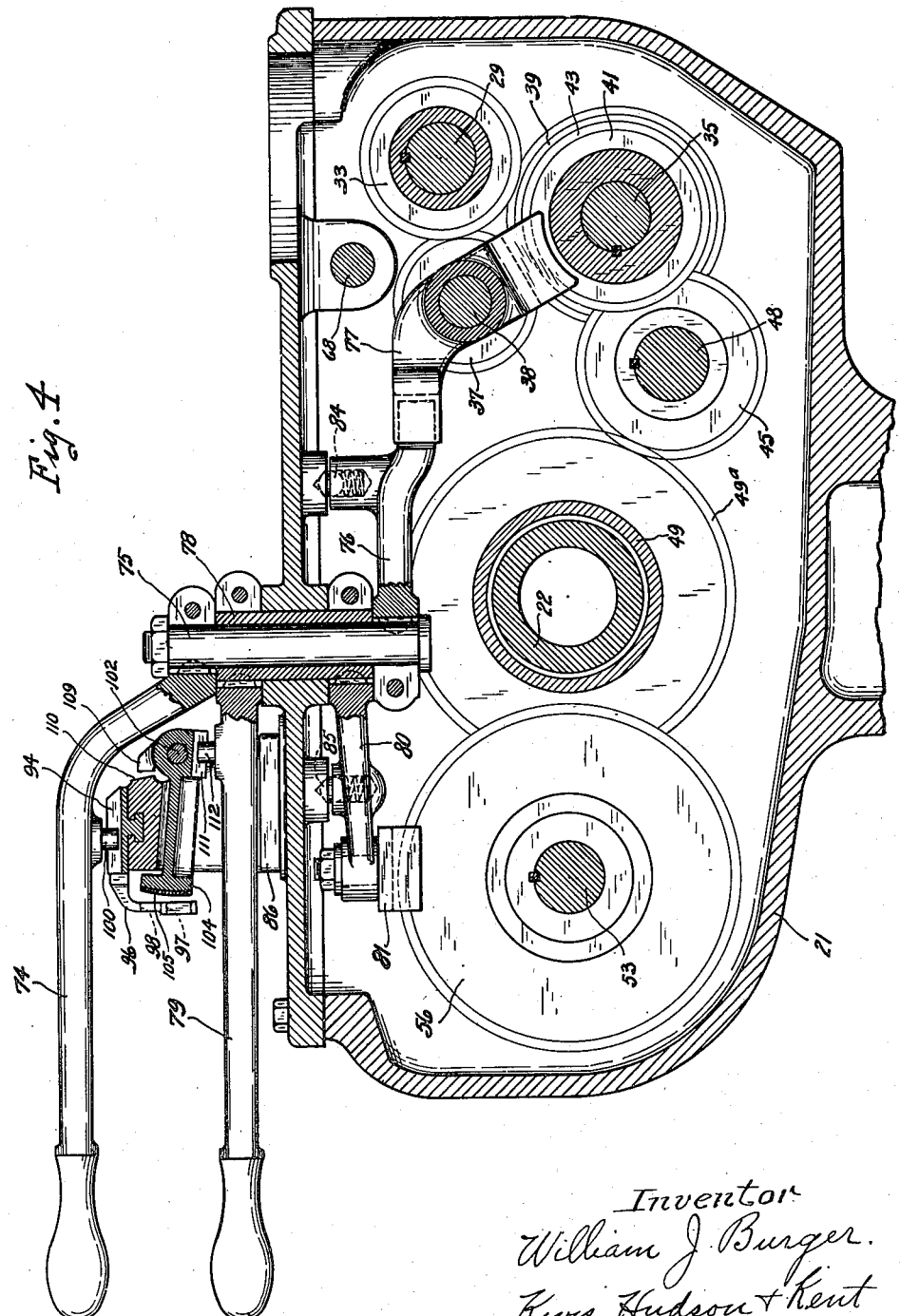

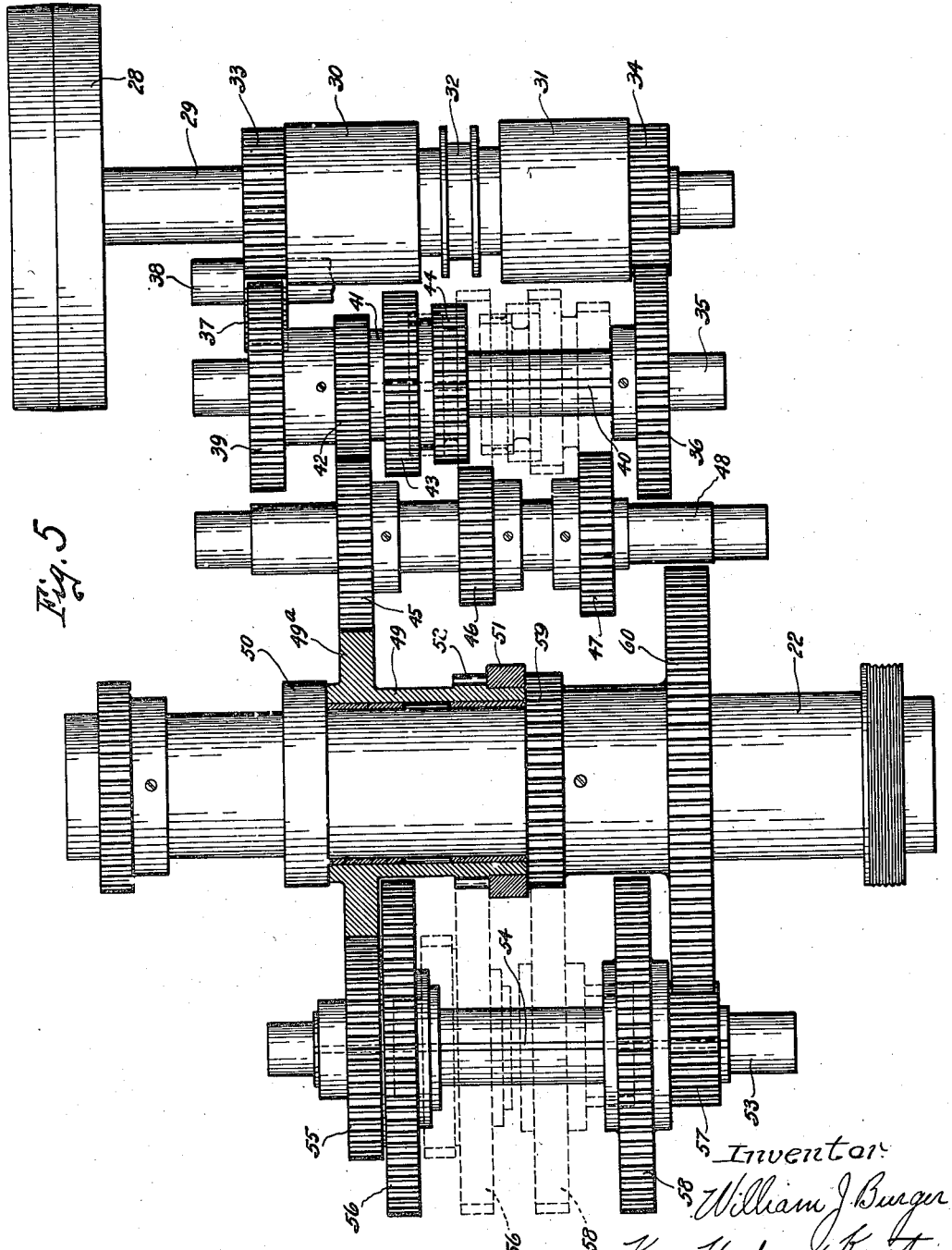

May 13, 1930. W. J. BURGER 1,758,427
INDICATING DEVICE
Filed March 8, 1929 6 Sheets-Sheet 6
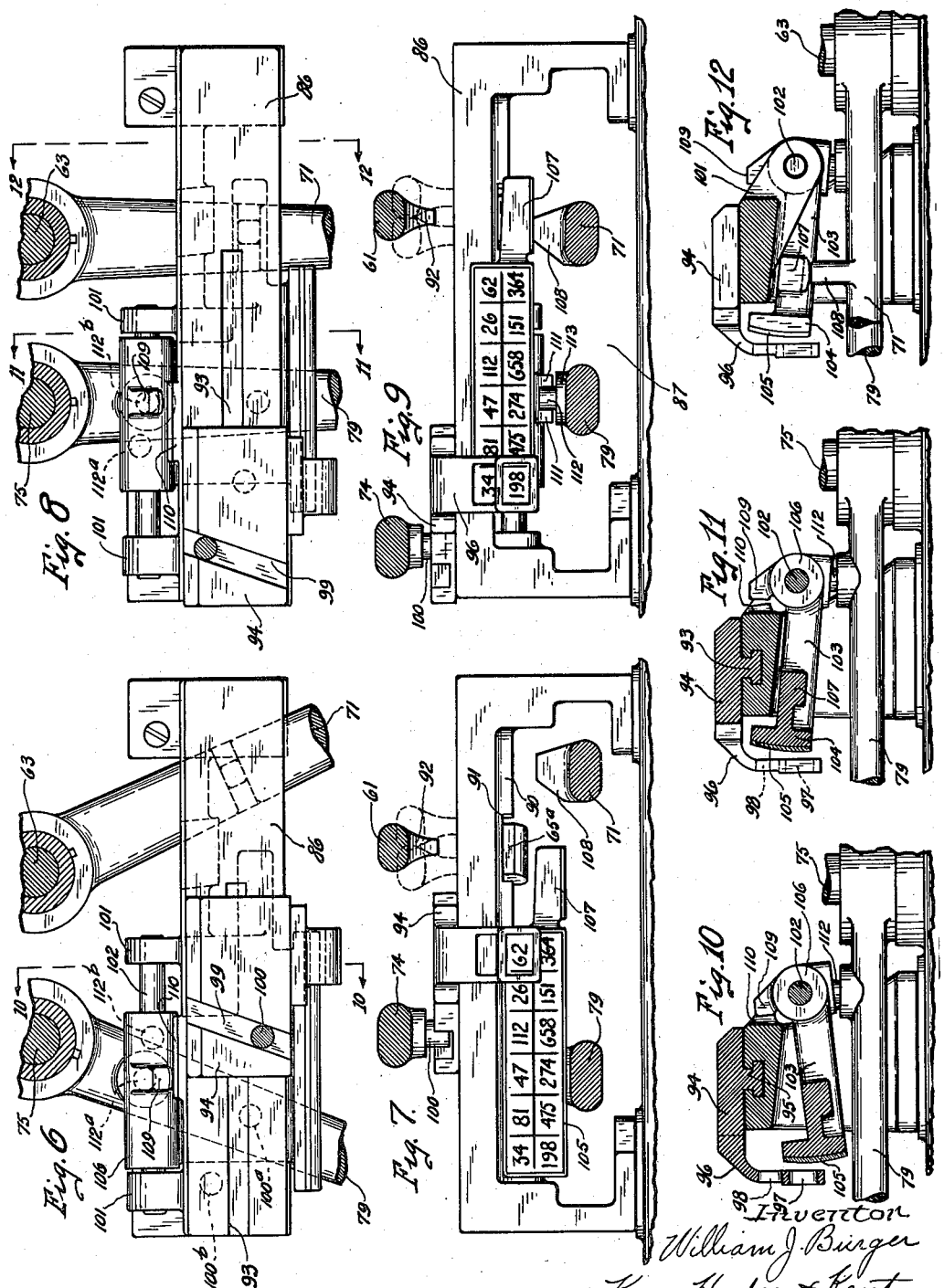

Patented May 13, 1930

1,758,427

UNITED STATES PATENT OFFICE

WILLIAM J. BURGER, OF SHAKER HEIGHTS, OHIO, ASSIGNOR TO THE WARNER & SWASEY COMPANY, OF CLEVELAND, OHIO, A CORPORATION OF OHIO

INDICATING DEVICE

Application filed March 8, 1929. Serial No. 345,399.

This invention relates to an indicating device and has especial utility when applied to parts of a machine tool, such as the headstock of a lathe, though it is not necessarily confined thereto as will be explained presently, since it also has utility when used with any type of machine having certain parts the speed of rotation or movement of which is to be indicated.

The invention is applicable to various types of machines such, for example, as a machine tool wherein a number of control members are required for clutching and unclutching and for speed change purposes or equivalent functions, the object of the invention being to provide visible means which directly indicates the rate of rotation or movement of certain parts of the machine, such as, for example, the revolutions per 20 minute of the work spindle of a lathe.

A further object of the invention is to accomplish the above mentioned result by means of one or more movable members connected to the control members so that the movement of the latter will position such movable member or members in various relationships and result in visibly indicating in a direct way the rate of rotation or movement of the certain part or parts of the machine.

Another object is to provide an indicating device which will increase the efficiency of setting the operating parts of the machine to obtain the desired rate of rotation of the work spindle or the rate of rotation or movement of other parts of the machine to thus reduce the time or period of operation required for completing a work piece.

The above and other objects are attained by the present invention which may be briefly summarized as consisting in certain novel combinations and arrangements of parts and details of construction which will be described in the specification and set forth in the appended claims.

In the accompanying sheets of drawings, the invention is shown applied to the headstock of a lathe.

In the drawings—

Fig. 1 is an elevational view of the head looking toward the work spindle;

Fig. 2 is a top plan view of the head;
Fig. 3 is a sectional view through the head taken substantially on the line 3—3 of Fig. 2;
Fig. 4 is a sectional view through the head taken substantially on line 4—4 of Fig. 2;
Fig. 5 is a diagrammatic view of the spindles and gearing in the head;
Fig. 6 is a fragmentary plan view of the head showing the indicating bracket, portions of only the lower levers being shown in this view;
Fig. 7 is a front elevational view of the indicating device, certain of the levers being shown in section and showing the parts in the relation illustrated in Fig. 6;
Fig. 8 is a view similar to Fig. 6, certain of the parts being shown in a different relation;
Fig. 9 is a front elevational view of the indicating device showing the parts in the same relation as in Fig. 8;
Fig. 10 is a sectional view taken on line 10—10 of Fig. 6, looking in the direction of the arrows;
Fig. 11 is a sectional view taken on line 11—11 of Fig. 8, looking in the direction of the arrows;
Fig. 12 is a sectional view taken on the line 12—12 of Fig. 8, looking in the direction of the arrows; and
Fig. 13 is a fragmentary side elevation, partly in section, of the main control lever and part of the indicating device.

Though the invention is not confined in its use to a lathe or to the head-stock or slide thereof but may be used to advantage on other 85 parts of a lathe and on other types of machines, it is especially useful, as stated above, when applied to the head-stock of a lathe and for that reason is so illustrated.

Referring to the drawings, the head 21 contains the gearing which operates the work spindle 22 which is adapted to carry a chuck (not shown) to support the work piece. The work spindle 22 extends through the head and slightly beyond the end thereof and is rotatably supported in bearings formed in the front and rear walls of the head, shown as driven from a pulley 28 in either direction through a double clutch and a series of speed change gearing which will now be specifically described.

A pulley 28 is mounted on the rear end of a pulley shaft 29 which is rotatably supported in the head, said shaft carrying two clutch members 30 and 31 arranged on each side of a shiftable clutch member 32 which may be shifted in either direction to rotate the work spindle in a forward or reverse direction. The clutch member 30 carries a gear 33, while the clutch member 31 carries a gear 34, both of which gears may be operatively connected to the pulley shaft 29 to rotate the shaft 35. When the gear 34 is clutched to the pulley shaft, it will rotate the shaft 35 through the gear 36 carried thereby and will rotate the work spindle in the forward direction. When the gear 33 is clutched to the pulley shaft 29 it will rotate an idle gear 37 carried on the shaft 38, said idle gear 37 in turn rotating the gear 39 fixed to the shaft 35, resulting in the rotation of the work spindle in a reverse direction. The shaft 35 intermediate the gears 36 and 39 is provided with a key-way 40 and slidably supports a three-step gear cone 41 consisting of three gears 42, 43 and 44, which gears may be selectively meshed with gears 45, 46 and 47 fixed to a shaft 48. In Fig. 5 of the drawings the three positions of the three-step gear cone 41 have been indicated, the position wherein the gear 42 of the cone is in mesh with the gear 45 being shown in full lines while the positions in which the gear 43 meshes with the gear 46 and the gear 44 meshes with the gear 47 have been shown in dotted lines. The gear 45 is in continual mesh with a gear 49$^a$ forming a part of the gear sleeve 49 rotatably mounted and supported on the work spindle 27 so that it may revolve in either direction on the work spindle independently of the rotation of the work spindle. The gear sleeve 49 is held against axial movement on the work spindle by the collar 50 and the gear 59, such gear sleeve carrying a second gear 52 separated from the gear 59 by a collar 51 carried by the gear sleeve. A shaft 53 provided with a key-way 54 slidably supports two pairs of gear cones which comprise, respectively, the gears 55 and 56 forming one cone and the gears 57 and 58 forming the other cone. As illustrated in Fig. 5 in full line position, the gear 55 of the rear cone is in mesh with the gear 49$^a$ of the gear sleeve 49 so that such gear sleeve will rotate the shaft 53 at one speed, but when the cone is shifted to the dotted line position, the gear 56 of the cone will mesh with the gear 52 of the gear sleeve to rotate the shaft at a different speed.

In order to rotate the work spindle 27, the same is provided, as stated above, with a gear 59 and with a second gear 60 spaced forwardly of the gear 59, both of the gears 59 and 60 being fixed to the spindle. These two gears are adapted to be selectively meshed with the gears 58 and 57 of the forward gear cone on the shaft 53 and, as indicated in full lines in Fig. 5, the gear 57 is in mesh with the gear 60 to drive the spindle at one speed, while in the dotted line position the gear 58 is in mesh with the gear 59 to drive or rotate the spindle at a different speed. It will thus be seen that the work spindle 27 may be rotated in either direction at twelve different speeds, three of which are derived through the three-step gear cone 41, six being derived through the addition of the two-step gear cone including gears 55 and 56, while the twelve speeds are derived through the addition of the other two-step gear cone including the gears 57 and 58.

The starting, stopping and reversing of the work spindle is controlled by the main operating lever 61 (see Fig. 3) which extends toward the front of the machine and is pivotally connected at its rear end to a bracket 62 which is keyed to a vertical shaft 63 supported in the cover plate for the head. The bracket 62 has two spaced upwardly extending ears 64 which are shown in Figs. 1 to 3 inclusive, between which ears a downwardly extending portion 65 of the lever is arranged so that when the lever is swung in either direction it will cause the bracket 62 and with it the shaft 63 to turn.

A lever arm 66 is keyed to the lower end of the shaft 63 and is in turn operatively connected with a sliding clutch shifting member 67 arranged on a shaft 68 which is supported in lugs carried by the cover plate of the head. The clutch shifting member 67 is provided with a yoke portion 69 operatively engaging the shiftable clutch member 32 so that when the main operating lever 61 is swung either to the right or to the left the shiftable clutch member 32 will engage the clutch 30 or the clutch 31 to drive the work spindle in the desired direction, but when the lever 61 is moved to neutral position, the shiftable clutch member 32 will be disengaged from either of said clutch members and thus allows the work spindle to come to a stop.

An independently rotatable sleeve 70 (see Fig. 3) surrounds the shaft 63 and is connected at its upper end to an operating lever 71 and at its lower end to a lever arm 72 which has at its outer end a pivoted connecting member 73 the lower end of which is U-shaped and straddles the gear 58. It will thus be seen that swinging the lever 71 in either direction will position the forward gear cone in either the full line or the dotted line position as shown in Fig. 5.

The operating lever 74 (see Fig. 4) has a downwardly extending portion which is keyed to a shaft 75 carried by the cover plate of the head, this shaft in turn being keyed to a lever arm 76 which is operatively connected with a shifting member 77 a portion of which straddles the gear 43 of the three-step gear cone 41, this shifting member being slidably mounted on the shaft 38 which extends crosswise of the head and carries the idle gear 37. Therefore, when the lever 74 is swung to either of its three operating positions, the three-step cone 41 will be moved to its three positions, one of which is shown in full lines and the other two of which are shown in dotted lines in Fig. 5.

A sleeve 78 is independently rotatable upon the shaft 75 and is keyed at its upper end to an operating lever 79 and at its lower end to a lever arm 80 which has at its outer end a pivoted connecting member 81, the lower portion of which is U-shaped and straddles the gear 56. Hence, when the lever 79 is swung to one position, the rearward gear cone will take the position shown in full lines in Fig. 5, and when the lever is moved to its other position, the gear cone will take the position shown in dotted lines in said figure.

The lever arm 72 (see Fig. 3) is provided with a socket which carries a spring-pressed ball detent 82, which detent is adapted to seat or to engage in a pair of recesses which are so positioned that when the gears mesh the detent will engage one of such recesses, these recesses being arranged in a downwardly projecting boss 83 on the under side of the cover plate for the head. The engagement of the ball detent in either of the recesses after the lever is swung to bring into mesh the desired gears is such that the lever will be maintained in the proper position until sufficient pressure is exerted thereon by a manual shifting of the lever to overcome the engagement between the detent and recess.

In the same way and for the same purpose, the lever arm 76 is provided with a socket which carries a spring-pressed ball detent 84 engaging in a plurality of recesses, in this instance three, carried by a downwardly extending boss on the under side of the cover plate, while the lever arm 80 is also provided with a socket carrying a spring-pressed ball detent 85 which engages in this instance with a pair of recesses likewise carried by a downwardly extending boss on the under side of the cover plate. Thus it will be seen that the three levers 71, 74 and 79 may be moved to various operating positions to effect the desired engagement of the change speed gearing and that such levers will be maintained in the position to which they have been moved until they are again manually moved to a different position.

The four levers are shown in substantially horizontal position and projecting toward the front of the machine, these levers being arranged in pairs, the levers of each pair being positioned one above the other and co-axially supported.

The lathe head, including the mechanism for operating the spindle and the arrangement of the levers for controlling the spindle, is not new with me and per se forms no part of the present invention.

The indicating device comprises a bracket 86 which is secured to the cover plate of the head and extends transversely of the levers intermediate their ends, the two lower levers extending through an opening 87 provided in the bracket while the two upper levers extend across and above the top of the bracket.

Before taking up the detailed description of the relationship between the change speed gear shifting levers, it will be well at this time to describe the relationship between the main control lever 61, which operates the clutch shifting member, and the bracket 86. As stated previously, the lever 61 is provided with a downward extension 65 (see Figs. 1, 3 and 13) which lies between the arms 64 of the lever bracket 62, and it will be noted that this extension 65 has a forwardly extending portion 65ª which underlies the lower edge of a downwardly projecting flange 90 forming a part of the bracket 86. The lever 61 is also provided with a socket 88 which carries a spring-pressed plunger 89 (see Fig. 3), the end of such plunger engaging the lever bracket 62 between the arms 64. It will be seen that the plunger 89 will tend to swing at all times the lever 61 in an upward direction so that the forwardly extending portion 65ª of the projection 65 will engage the edge of the downwardly extending flange 90 arranged at the upper edge of the opening in the bracket 86. For the purpose of maintaining the lever 61 in neutral position, the flange 90 is provided with a notch 91 into which the portion 65ª will move as soon as the lever is swung to neutral position since it is forced upwardly by the spring-pressed plunger 89. The strength of the spring 88 is sufficient to raise the weight of the lever and to maintain the portion 65ª in the notch 91, but as soon as the operator has grasped the lever the weight of his hand thereupon will lower the lever until a downwardly projecting lug 92 carried by the lever will engage the top surface of the bracket 86 (as shown in Fig. 13), during which movement the portion 65ª will be disengaged from the notch 91 and the lever will be free to be swung in either direction.

In order to provide for an efficient control and operation of the machine by the levers, it is proposed to have the levers operatively associated with an indicating device which enables the operator, upon shifting the levers, to attain the desired speed of operation of the work spindle and to read directly on the indicating device the speed at which the work spindle is operating resulting from the shifting of the levers. To this end, the bracket 86 of the indicating device is provided on its upper face with a guideway 93 extending lengthwise of the bracket substantially along the middle line thereof from a point substantially midway of the ends to the rear end of the bracket, such guideway preferably being in the form of a T-slot. A slide 94 having on its under side a T-shaped guide strip 95 arranged in the guideway 93 has a sliding movement upon the upper face of the bracket, the slide 94 being provided with a forwardly and downwardly extending portion 96 which carries at its lower end an opening or window 97 with a smaller opening 98 located just above said first-named opening or window. The slide 94 is provided on its upper side with a slot 99 extending diagonally and transversely across the slide, and in this slot a downwardly extending pin 100 carried by the lever 74 is arranged so that movement of said lever will move said slide endwise upon the upper face of the bracket, the various positions to which the lever is swung, in this instance three positions, being indicated in Fig. 6 by the full line position of the pin 100 and by the two dotted line positions of the pin indicated at 100ª and 100ᵇ respectively.

The bracket 86 is provided with a pair of spaced bearing arms 101 (see Figs. 6 and 12), which arms extend from the rear face of the bracket toward the rear of the machine. A rod 102 is supported by the arms 101 and in turn slidably and rockingly supports an indicating member 103 which extends toward the front of the machine through the opening 87 in the bracket 86. The indicating member 103 is provided at its forward end with a face portion 104 upon which is suitably secured an indicating plate 105 which carries indicia for the different revolutions per minute at which the work spindle is to be operated, such face portion lying between the forwardly and downwardly extending portion 96 of the slide 94 and the front face of the bracket 86 so that any one of the members forming the indicia upon the plate 105 may be observed through the window or opening 97 on the portion 96 when such number has been brought into registry with the window by the various operations or movements of the levers. The indicia upon the plate 105 comprises two horizontally arranged groups of spaced numbers, each number of the upper group being arranged above a number of the lower group. The opening 98 above the window 97 of the slide does not perform any function when the indicating member is arranged as shown in Figs. 7 and 10, as in that instance a number of the upper group is visible through the window 97 and the number of the lower group directly below it is visible below the window 97. However, when the indicating member 103 is arranged as shown in Figs. 9 and 11, some number of the lower group will be visible through the window 97, while the number of the upper group immediately above it will be visible through the opening 98. The indicating member 103 is provided at its rear end with a bearing portion 106 which is slidably and rockingly arranged upon the rod 102, thus enabling the indicating member 103 to be rocked to the positions shown in Figs. 10 or 11 and also enabling it to be slid endwise on the rod 102 so as to move the various numbers on the plate 105 under the window 97 of the slide 94. In order to rock the indicating member to its upper position, it is provided with an extended portion 107 which is slightly rounded on its under surface, as clearly shown in Fig. 12, such portion 107 together with the indicating member being cammed upwardly to a position as shown in Figs. 11 and 12 when the lever 71 is moved from the position shown in Figs. 6 and 7 to the position shown in Figs. 8 and 9. This upward camming of the indicating member 103 is effected by the engagement of the inclined portion of a cam lug 108 carried by the lever 71 with the rounded under surface of the extension 107, as is clearly shown in Figs. 9 and 12. When the lever 71 is swung to the position shown in Figs. 6 and 7, the indicating member 103 will be free to swing by gravity to the position shown in Fig. 10 and will be held in such position by the engagement of an abutting lug 109 extending upwardly from the bearing portion 106 of the indicating member with an abutment strip 110 extending outwardly from the rear face of the bracket 86. Thus it will be seen that the indicating member 103 will take two positions, namely, the upper position when the under surface of the extension 107 is resting on the cam 108 carried by the lever 71, and the lower position as shown in Fig. 10, when the abutting lug 109 is in engagement with the abutment strip 110, thus bringing either the upper group or the lower group of numbers opposite the window 97 of the slide 94.

In order to provide for the sliding movement of the indicating member 103, the bearing portion 106 of such member is provided on its under side substantially midway of its ends with a pair of spaced, downwardly extending lugs 111 forming a slot which extends transversely of the bearing portion and receives a pin 112 extending upwardly from a boss 113 arranged upon the lever 79, as clearly indicated in Figs. 4 and 9. Thus it will be seen that when the lever 79 is moved to one of its two positions the pin 112 is located at 112ª, and when the lever is swung to the other position, the pin 112 will be located in the position 112ᵇ as shown by dotted lines in Fig. 6, the two positions of the lever also being shown respectively in Figs. 6 and 8. These movements of the lever 79 move the indicating member endwise of the bracket 86 so as to shift the indicating member and bring the next figure beneath the window 97 in the slide. The radius of the arc through which the pin 112 moves is one-half the radius of the arc through which the pin 100 moves. When the lever 74 is moved from operating position to its next operating position, such movement will cause a shifting of the slide a distance equivalent to two numbers, while the shifting of the lever 79 from one position to another will cause the shifting of the indicating member a distance equivalent to one number. It should be understood, of course, that the ratio between the radii of the arcs through which the pins 100 and 112 move could be suitably varied so as to result in the window being moved a distance equivalent to a different number of numbers and the indicating member 103 also being moved through a distance equivalent to a different number of numbers, such ratio being determined by the distance through which the gear cones move from one position to another and the number of gears upon the gear cones which are shifted by the levers 74 and 79.

Having specifically described the details of construction of the embodiment of the invention herein illustrated, the following description will set forth the operation of the device by explaining the manner in which the various movements of certain parts of the indicating device are brought about and result in the indicating device visibly and directly showing the revolutions per minute at which the work spindle rotates.

Assuming that the clutch shifting member is in neutral position and the levers are set to cause the work spindle to rotate at sixty-two revolutions per minute, the levers and the indicating device will be in the relative positions shown in Figs. 6 and 7 and the number 62 can be observed through the window 97. In other words, the lever 71 will be in a position in which the cam lug 108 is disengaged from the extension 107 of the indicating member so that the latter has moved down by gravity to bring the upper group or row of numbers in line with the window of the slide, and the lever 71 being operatively connected to the forward two-step gear cone, the gears 57 and 58 are in the full line position as shown in Fig. 5 with the gear 57 in mesh with the gear 60. The lever 74 which moves the slide endwise of the bracket is in its extreme right-hand position, and since this lever is operatively connected to the three-step gear cone 41, this cone is in its extreme left-hand position, as shown in full lines in Fig. 5, with the gear 42 in mesh with the gear 45. The slide 94, being connected to the lever, is also in its extreme right-hand position with the window 97 over the number 62 of the upper group of numbers upon the indicating member 103. The lever 79 controlling the movement of the indicating member endwise of the bracket is at its extreme left-hand position, and since this lever is operatively connected to the rear two-step gear cone, this gear cone will be at its extreme rearward position, as indicated in full lines in Fig. 5, with the gear 55 thereof meshing with the gear 49ª.

If it is desired, for example, to have the work spindle rotate at one hundred and ninety eight revolutions per minute, as indicated in Figs. 8 and 9, the lever 71 is swung to its left-hand position, thus moving the forward two-step gear cone to its dotted line position, as shown in Fig. 5, and bringing the gear 58 into mesh with the gear 59 and at the same time camming the indicating member upward so that the extension 107 is resting upon the cam lug 108, as shown in Fig. 9, with the lower group or row of numbers visible through the window 97. This movement of the lever 71 and the shifting of the two-step gear cone has changed the number behind the window to 364, and if the clutch would be engaged at this time the work spindle would rotate at three hundred and sixty-four revolutions per minute. The lever 74 is moved from its extreme right-hand position to its extreme left-hand position, thus shifting the three-step gear cone 41 to its most forward position to bring the gear 44 into mesh with the gear 47 and at the same time moving the slide 94 to its extreme left-hand position and bringing the window 97 opposite the number 475. If the clutch were now engaged, the work spindle would rotate at four hundred and seventy-five revolutions per minute, and this speed would be visibly and directly indicated through the window 97. The lever 79 is moved to its right-hand position, thus moving the rearward two-step gear cone to its forward or dotted line position as shown in Fig. 5, with the gear 56 meshing with the gear 52 and at the same time moving the indicating member to its right-hand position to bring the number 198 beneath the window. These movements having been effected and the clutch engaged, the work spindle will now be rotated by the main drive shaft through the gears at a speed of one hundred and ninety-eight revolutions per minute and the number 198 will be visible and directly readable upon the indicating device.

It should be observed that the shifting of the lever 74 from its extreme right-hand position to its extreme left-hand position, as described above, has moved the slide to its left-hand position and has moved the window four spaces to the left, thus shifting the window from in front of number 364 to in front of number 475 and has also changed the position of the gear cone 41 so that in place of the gear 42 meshing with the gear 45 the gear 44 will now be in mesh with the gear 47. As the lever 74 controls the position of the three-step gear cone 41, it will, when moved to an intermediate position, bring the gear 43 into mesh with the gear 46 which movement of the lever would result in positioning the window of the slide at a point intermediate the numbers 364 and 475, or, in other words, over the number 658, the window having moved two spaces.

It will be observed that in order to obtain the numbers intermediate the positions of the window as explained above if it is desired to rotate the work spindle at a speed as indicated by said numbers, the movement of the lever 79 from one extreme position to the other will move the indicating member 103 endwise of the bracket so as to bring such intermediate number behind the window and at the same time will shift the rearward two-step gear cone to bring the gears 55 and 56 selectively into mesh with their respective gears 49 and 52. As will be seen, the extension 107 of the indicating member 103 is of such length (see Fig. 9) that if the indicating member is shifted from its right-hand position (as shown in Fig. 9) to its left-hand position the extension will still rest upon the cam lug 108 and will remain in its elevated position. It will also be noticed that the abutment strip 110 at the rear face of the bracket is of such length that when the indicating member is shifted endwise, the abutting lug 109 at all times remains in engagement with the abutment strip.

Thus it will be observed that when the operating levers are moved to shift the change speed gearing to obtain the desired speed of rotation of the work spindle, the number indicating the number of revolutions per minute of the work spindle thus obtained will be directly visible on the indicating device through the window.

While the invention has been illustrated as applied to the head-stock of a lathe, it is not desired to confine the same thereto since the invention is susceptible of being applied to other parts of a lathe and also to other forms of machines wherever it is desired to know the rate of rotation or movement of an operating part of such machine. It is aimed in the claims appended hereto to cover all such embodiments of the invention which do not involve a departure from the spirit and scope of the invention. Furthermore, although the indicating member 103 is in this instance provided with indicia in the form of numerals which indicate the rate of movement of the spindle in revolutions per minute it is not necessary that this precise type or form of indicia be employed on the indicator, but the rate of movement may be directly indicated by other forms of indicia such as other numbers or letters which are suitably indicative of the speed or rate of movement of the part whose movement is controlled.

Having thus described my invention, I claim:

1. An indicating device associated with the members controlling a part of a machine, said device being operated by said members and directly indicating the rate of movement of such controlled part.

2. An indicating device associated with a plurality of members for controlling a part of a machine, said device having a member operated by said control members and directly indicating the rate of movement of such controlled part.

3. An indicating device associated with a plurality of members for controlling a part of a machine, said device having a plurality of members operatively connected to said control members and directly indicating the rate of movement of such controlled part.

4. An indicating device associated with a plurality of members for controlling a part of a machine, said indicating device having a member which has an operating connection with said control members and directly indicates the rate of movement of said controlled part.

5. An indicating device associated with a plurality of members for controlling a part of a machine, said device having a plurality of members operatively connected with the control members and cooperably movable thereby to directly indicate the rate of movement of such controlled part.

6. An indicating device associated with the members for controlling a part of a machine, said device having a movable member, said movable member being operatively connected with one of said control members to move in one direction and being operatively associated with another of said control members to be moved thereby in another direction.

7. An indicating device associated with the members for controlling a part of a machine, such device having a movable member which is operatively associated with said control members and movable thereby in a plurality of directions transverse with respect to each other to directly indicate the rate of movement of such controlled part.

8. An indicating device associated with the members for controlling a part of a machine, said device having a plurality of movable members operatively connected with said control members and movable thereby in opposite directions to directly indicate the rate of movement of such controlled part.

9. An indicating device associated with the members for controlling a part of a machine, said device having a plurality of movable members operatively associated with certain of said control members to be moved thereby, one of said movable members also having an operative association with another control member to be moved thereby in a direction different from the direction of its first-named movement.

10. An indicating device associated with the control members of the mechanism for controlling the rate of movement of a part of a machine, said device having a member provided with indicia indicating the various rates of movement at which such part may be moved and actuated by the operation of said control members to directly indicate the rate of movement of the controlled part.

11. In combination with a machine having a part to be moved, means for selectively moving such part at various rates, members to control the operation of said means and the rate of movement of said part, and an indicating device, said device having an operative connection with said control members to directly indicate the rate of movement of said part.

12. In combination with a machine having a part to be moved, means for selectively moving said part at various rates, members to control the rate of movement of said part and the operation of said means, and an indicating device, said device having a member operatively associated with said control members and movable thereby to directly indicate the rate of movement of said controlled part.

13. In combination with a machine having a part to be moved, means for selectively moving said part at various rates, members to control the rate of movement of said part and the operation of said means, and an indicating device, said device having a plurality of members operatively connected with said control members and movable thereby to directly indicate the rate of movement of such controlled part.

14. The combination with a machine having a part to be moved, means for selectively moving said part at various rates, members for controlling the rate of movement of said part and the operation of said means, and an indicating device, said device having a plurality of movable members one of which is provided with indicia indicating the various rates of movement at which said part may be moved, said movable members being operatively connected with the control members and movable thereby to directly indicate the rate of movement of said part.

15. In combination with a machine having a part which may be moved at various rates, means for selectively moving said part at the desired rate, members for controlling the rate of movement of said part and the operation of said means, and an indicating device having a plurality of movable members, one of which carries indicia indicating the various rates of movement at which said part may be moved, said movable members being operatively connected with the control members and movable thereby in different directions to directly indicate the rate of movement of said part.

16. In combination with a machine having a part to be moved at various rates, means for selectively moving said part at the desired rate, members for controlling the rate of movement of said part and the operation of said means, and an indicating device having a plurality of members operatively connected with said control members and movable thereby in different directions, one of said members having indicia indicating the various rates of movement at which said part may be moved and another of said members having an opening through which one of the numbers of said indicia corresponding to the rate of movement of said part may be read directly.

17. In combination with a machine having a part to be moved at various rates, means for selectively moving said part, members for controlling the rate of movement of said part and the operation of said means, and an indicating device having a plurality of members operatively associated with said control members and movable thereby, one of said members carrying indicia indicating the various rates at which said part may be moved and another of said members having an opening through which a number corresponding to the rate of movement of the part may be read directly, said movable members being moved by said control members in various directions, and one of said movable members being operatively associated with one of the control members to be moved in a different direction to its first-named directions of movement.

18. An indicating device associated with the members for controlling a part of a machine to be moved at various rates, said device having a plurality of movable members operatively associated with said control members, one of said members having a sliding movement and another of said members having an angular movement with respect to the direction of movement of the first-mentioned member to directly indicate the rate of movement of said controlled part.

19. An indicating device associated with the members for controlling the rate of movement of a part of a machine, said device having a plurality of movable members operatively associated with said control members, one of said movable members having a sliding movement and the other of said movable members having a compound movement to directly indicate the rate of movement of said controlled part.

20. An indicating device associated with the members for controlling the rate of movement of a part of a machine, said device having a member in the form of a slide and a second member in the form of a slide which is also capable of being rocked, one of said members having indicia indicating the various rates at which said part may be moved and the other of said members having an opening through which one of the numbers forming the indicia and corresponding to the rate of movement of the part may be directly read.

21. An indicating device associated with the free members for controlling the rate of movement of a part of a machine, said device having a member in the form of a slide and another member in the form of a slide which is capable also of being moved angularly with respect to its sliding movement, said first-named member being operatively connected with one of said control members to slide the same and the other member being operatively connected with another of said control members to give it its sliding movement and operatively associated with the third control member to give it its angular movement, one of said sliding members having indicia indicating the various rates of movement at which said part may be moved and the other of said sliding members having an opening through which a number of said indicia corresponding to the rate of movement of said part may be directly read.

22. In combination with a machine having a driving member, a driven member, means for selectively driving said driven member from said driving member at various rates, members for controlling the rate at which the driven member may be driven and for controlling the operation of said means, and an indicating device having means operatively connected with said control members to indicate the rate of movement of the driven member in a direct way.

23. In combination with a machine having a part to be moved, a driving member, means intermediate said driving member and said part for selectively moving the latter at various rates, means intermediate said driving member and said last-named means for engaging and disengaging said driving member from said first-named means, members for controlling the rate of movement of said part and the operation of said first-named means, and an indicating device having means operatively connected with said control members to directly indicate the rate at which said part will move when the driving member is engaged.

24. An indicating device associated with the control members of a machine having a part which may be moved at different rates, said device comprising a support secured to the machine, a slide movably mounted on the support, and a second slide carried by the support and projecting through an opening therein, said first-named slide having a portion overlying the projecting end of said second-named slide and provided with an opening therein, said projecting end of said second-named slide being provided with indicia indicating the various rates of movement of said part of the machine, both of said slides being operatively connected to said control members to directly bring under the opening a number of said indicia corresponding to the rate at which said part may be moved.

25. An indicating device associated with the members for controlling the rate of movement of a part of a machine, said device comprising a support, a slide movably mounted upon said support and having a portion provided with an opening, a second slide carried by said support so as to slide and rock thereon, said second slide projecting through an opening in said support and having its end lying between said portion of said first slide and the support and provided with indicia including a plurality of rows of numbers indicating the various rates of movement at which such part of the machine may be moved, said first-named slide being operatively connected to one of said control members and movable thereby, said second-named slide being operatively connected to another of said control members to slide the same and operatively associated with a still different control member to rock the same to bring one row of numbers or the other of the indicia behind the opening in said portion of said first-named slide.

26. In combination with a machine having a plurality of members for controlling the rate of movement of a part of the machine, a support, a portion projecting from said support and having an opening therein, a member carried by the support so as to be capable of sliding and rocking movements and having a portion lying between said projecting portion and the support and provided with a plurality of rows of numbers indicating the various rates of movement at which the part may be moved, one of said control members being operatively connected with said last-named member to move it endwise of the support and another of said control members being operatively associated with said member to rock the same to bring the different rows of numbers in line with the opening in said projecting portion.

27. An indicating device operatively associated with a plurality of members for controlling the rate of movement of a part of a machine, said device comprising a support, a slide movable thereon and having a portion spaced from a face of the support and provided with an opening, and an indicia bearing member arranged between such portion and said face of the support and rockingly carried by said support, said slide being operatively connected with one of said control members to move therewith and said indicia bearing member being operatively associated with another of said control members to be rocked thereby.

28. An indicating device operatively associated with a plurality of members for controlling the rate of movement of a part of a machine, said device comprising a support, a slide movable thereon and having a portion spaced from one face of the support and provided with an opening, and an indicia bearing member arranged between such portion and said face of the support and slidingly and rockingly carried by said support, said slide being operatively connected with one of said control members to move therewith, said indicia bearing member being operatively connected with another of said control members to move therewith and operatively associated with a still different control member to be rocked thereby.

29. In combination with a machine having a part to be moved at various rates and a plurality of members for controlling the rate of movement of such part, an indicating device comprising a support having an opening therethrough, and a member movable endwise of the support, one of said control members extending through the opening in said support and being operatively connected with the movable member to move the latter to indicate directly the rate of movement of said part.

30. In combination with a machine having a part to be moved at various rates and a plurality of members for controlling the rate of movement of such part, an indicating device comprising a support having an opening extending therethrough, one of said control members extending through the opening in the support and another of said control members arranged outside of the support, and a plurality of slides arranged on the support, one of which is operatively connected with the control member which extends through the opening and another of which is operatively connected with the control member which is outside of the support.

31. In combination with a machine having a part to be moved at various rates and a plurality of members for controlling the movement of such part, an indicating device comprising a support having an opening therethrough, certain of said control members extending through said opening in the support and another of said control members arranged outside the support, and a plurality of movable members arranged on the support one of which is operatively associated with the control member which is arranged outside of the support to be moved thereby endwise of the support and another of which is operatively connected with one of the control members which extends through the opening in the support to be moved thereby endwise of the support and is operatively associated with another control member which extends through the opening to be rocked thereby.

32. In combination with a machine having a part to be moved at various rates and a plurality of members for controlling the rate of movement of such part, an indicating device comprising a support having an elongated opening therethrough, said support being provided with a portion overlying a face of the support and having an opening therein, and a member arranged on the support so as to have a sliding and rocking movement and being provided with indicia the numbers of which are arranged in rows and indicate the various rates of movement at which such part may be moved, said member being operatively connected with a control member which extends through the opening in the support to be moved thereby and operatively associated with another control member which extends through the opening in the support to be rocked thereby to bring behind the opening in said overlying portion a number of the indicia corresponding to the rate at which such part is moved.

33. In combination with the head of a lathe having a work spindle, variable speed driving means therefor, and a plurality of levers for controlling said means and the rate of rotation of the work spindle, an indicating device having a plurality of members operatively connected to said control levers to be moved thereby to directly indicate the rate of rotation of the work spindle.

34. In combination with the head of a lathe having a work spindle, variable speed driving means therefor, and a plurality of levers controlling the rate of rotation of the work spindle, an indicating device comprising a support having an opening therethrough through which certain of said levers extend, and a member slidingly and rockingly arranged on said support and having an operative connection with one of the levers which extends through the opening to be moved thereby and an operative association with another of the levers which extends through the opening to be rocked thereby.

35. In combination with the head of a lathe having a work spindle, variable speed driving means therefor, and a plurality of levers for controlling the operation of said means and the rate of rotation of the work spindle, an indicating device comprising a support having an opening through which certain of said levers extend and a face over which certain other of said levers extend, a portion carried by said support and extended across a face thereof in spaced relation to such face and provided with an opening, such portion having an operative connection with a lever which extends across and above a face of the support, and a member slidably arranged on said support and having an indicia bearing portion arranged between said first-named portion and the face of the support, said member being operatively connected with one of the levers which extends through the opening in the support and movable thereby.

36. In combination with the head of a lathe, a work spindle, variable speed driving means therefor, and a plurality of levers for controlling said means and the rate of rotation of the work spindle, an indicating device comprising a support having an opening, certain of said levers extending through said opening and certain other of said levers extending over said support, a slide arranged on the upper face of said support and having a portion extending downwardly and in front of the front face of said support and provided with an opening, said slide being operatively connected with a lever extending over the support to be moved thereby endwise of the support, and a second slide arranged on the support and capable of a rocking movement and having a portion extending through the opening in the support and provided on its front end with an indicia bearing face arranged between said opening and the front face of the support, said second slide being operatively connected to one of the levers which extends through the opening in the support to be moved thereby endwise of the support and operatively associated with another of the levers which extends through said opening to be rocked thereby, the movements imparted to said slides effecting a cooperative relationship between the opening and the indicia bearing face to directly indicate the rate of rotation of the work spindle.

37. An indicating device operatively associated with a plurality of members for controlling the rate of movement of a part of a machine, said device comprising a support having an opening through which certain of said control members extend and also having a portion spaced from one face of the support and provided with an opening, an indicia bearing member arranged between such portion and said face of the support and slidingly and rockingly carried by said support, said indicia bearing member having an extension adapted to be operatively associated with one of the control members which extends through the opening in the support to rock the same, said indicia bearing member also having an operative connection with another of said control members which extends through the opening in the support to be moved thereby endwise of the support.

38. An indicating device associated with a plurality of members for controlling a part of a machine, said device having a plurality of members operatively connected with the control members and movable thereby in various directions to directly indicate the rate of movement of said controlled part.

39. An indicating device associated with the control members of a machine having a part which may be moved at different rates, said device comprising a support secured to the machine, an indicating slide movably mounted on the support, and a second indicating slide carried by the support and projecting through an opening therein, said first-named slide having a portion overlying the projecting end of said second-named slide and provided with an opening therein, both of said slides being operatively connected to said control members.

40. In combination with a machine having a part to be moved, a driving member, variable speed change means for moving said part at different rates, means for engaging said driving member with said speed change means or for disengaging said driving member from said speed change means, a plurality of control members one of which controls said last-named means and the others of which control said speed changing means, and an indicating device comprising a support, members carried by said support and having an operative connection with the control members which control the speed changing means to directly indicate the rate of movement of said part, and means on said support cooperating with the control member for the engaging and disengaging means to lock said member in disengaged position.

In testimony whereof, I hereunto affix my signature.

WILLIAM J. BURGER.